United States Patent [19]

Herriau

[11] Patent Number: 4,646,939
[45] Date of Patent: Mar. 3, 1987

[54] SELECTOR DEVICE FOR THE DISTRIBUTOR OF A SO-CALLED "SINGLE SEED" SEED DRILL

[75] Inventor: Paul Herriau, Cambrai, France

[73] Assignee: Societe Sogefina, Societe de Gestion Financiere Armoricaine (Societe Anonyme), Paris, France

[21] Appl. No.: 729,884

[22] Filed: May 2, 1985

Related U.S. Application Data

[63] Continuation of Ser. No. 482,289, Apr. 5, 1983, abandoned.

[30] Foreign Application Priority Data

Apr. 9, 1982 [FR] France .................. 82 06233

[51] Int. Cl.$^4$ .............................................. B23Q 7/04
[52] U.S. Cl. ...................................... 221/211; 111/34; 111/77
[58] Field of Search ............... 221/211, 210, 265, 278; 111/34, 37, 77

[56] References Cited

U.S. PATENT DOCUMENTS

| | | | |
|---|---|---|---|
| 3,048,132 | 8/1962 | Morgan et al. | 111/77 |
| 3,348,504 | 10/1967 | Fischer | 111/34 |
| 3,693,833 | 9/1972 | Weits | 221/211 |
| 3,796,346 | 3/1974 | Ribouleau | 221/211 |
| 3,871,295 | 3/1975 | Ackley . | |
| 4,018,358 | 4/1977 | Johnson et al. | 221/211 |
| 4,023,509 | 5/1977 | Hanson | 111/77 |
| 4,029,235 | 6/1977 | Grataloup | 221/211 |
| 4,403,713 | 9/1983 | Herriau | 221/265 |
| 4,449,642 | 5/1984 | Dooley | 111/34 |

FOREIGN PATENT DOCUMENTS

| | | | |
|---|---|---|---|
| 1022007 | 6/1977 | Canada | 111/34 |
| 0037337 | 10/1981 | European Pat. Off. . | |
| 1410390 | 8/1965 | France . | |
| 2120821 | 8/1972 | France . | |
| 2305114 | 10/1976 | France . | |
| 596064 | 2/1978 | Switzerland . | |
| 915492 | 1/1963 | United Kingdom | 111/77 |

Primary Examiner—H. Grant Skaggs
Assistant Examiner—Kenneth Noland
Attorney, Agent, or Firm—Young & Thompson

[57] ABSTRACT

A selector device for a distributor of a so-called "single-seed" seed drill. It comprises a transportation member, a surface of which moves continuously between a seed hopper and a transportation device with, in that surface, orifices communicating with a vacuum source for maintaining by suction the seeds against that surface. A groove formed on the distributor surface extends over the suction orifice, the axis of the groove being perpendicular to the path of travel of the suction orifice, with a deflector the limit of the action range of which is clear from the path of travel of the axis of the suction orifices by about the radius of a seed.

2 Claims, 11 Drawing Figures

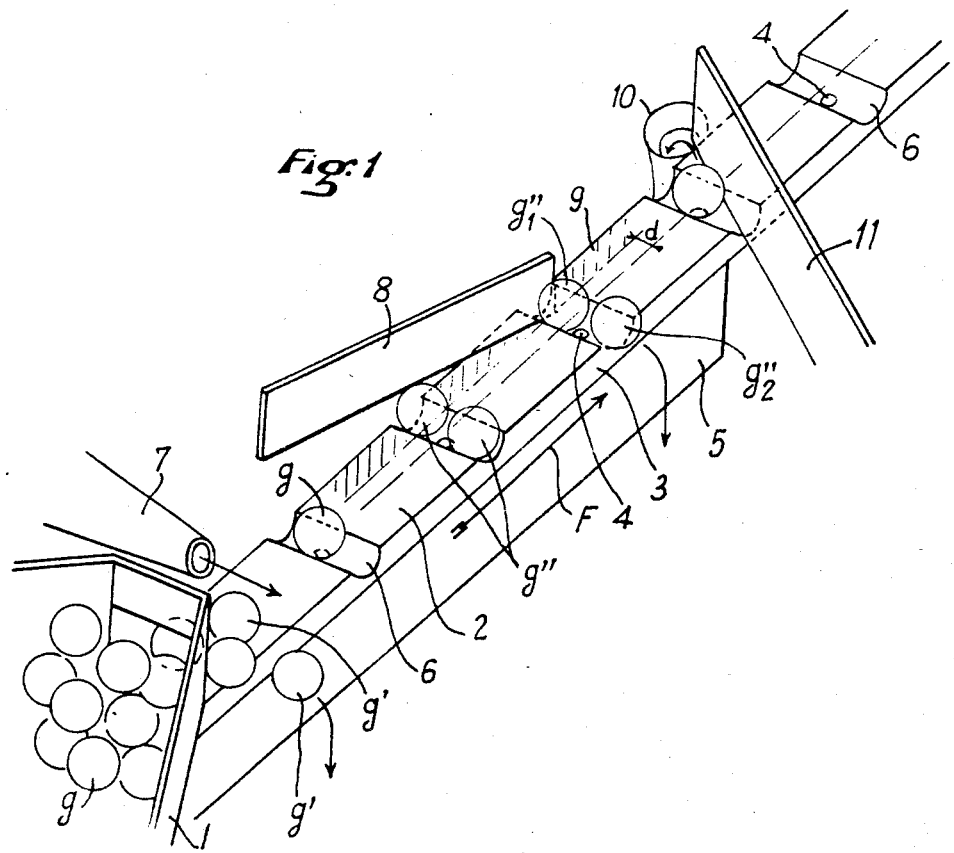
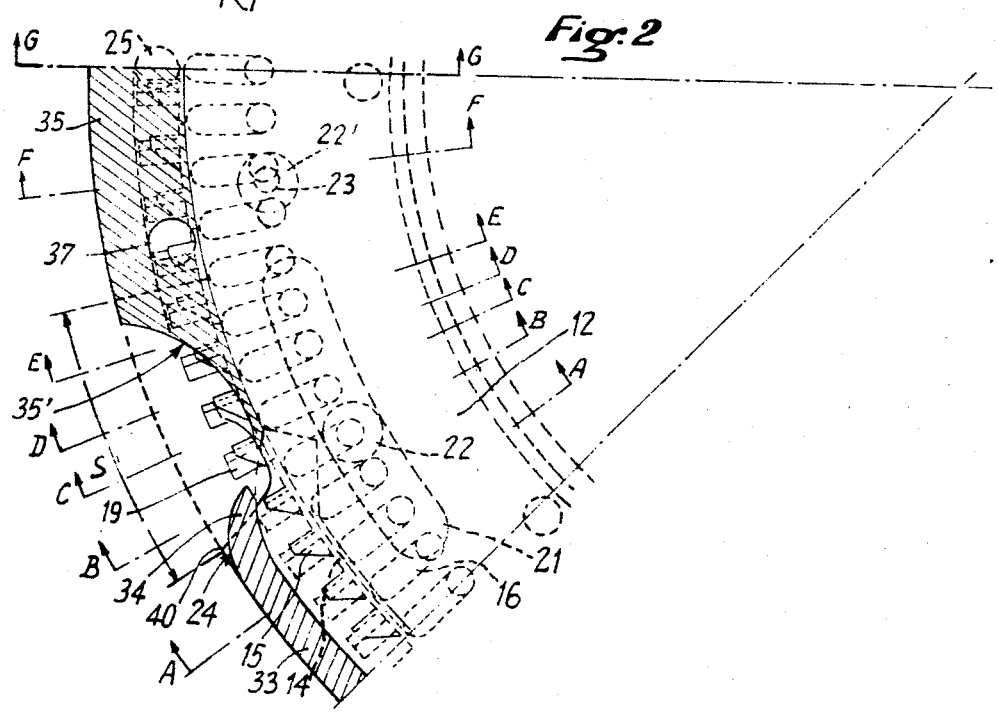

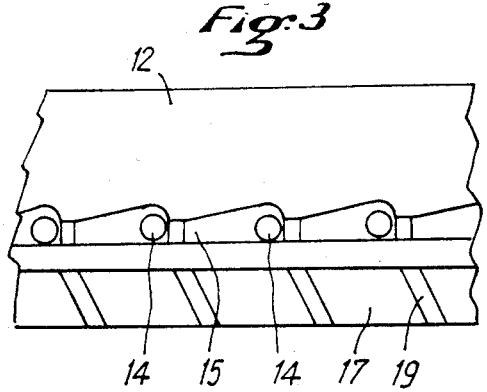
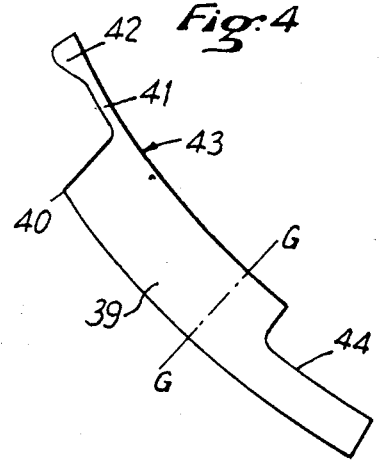
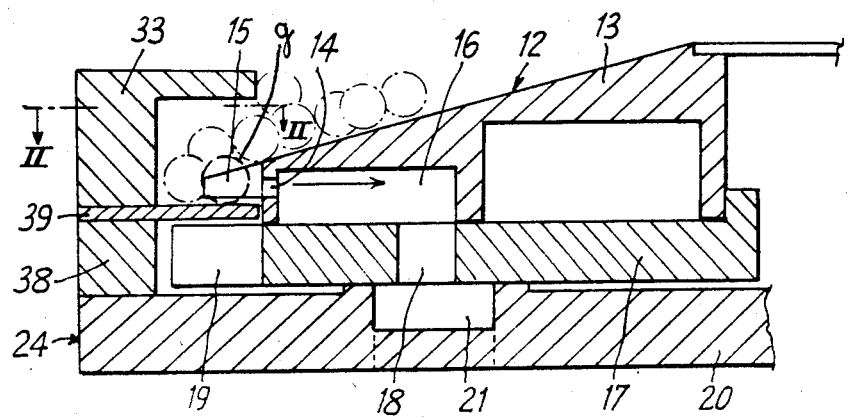
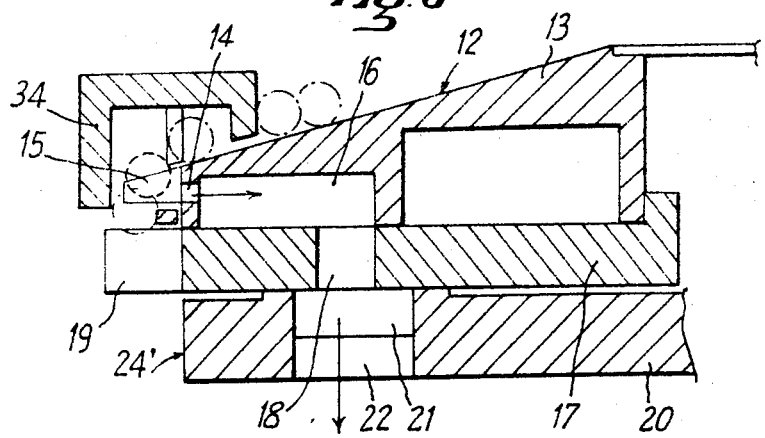

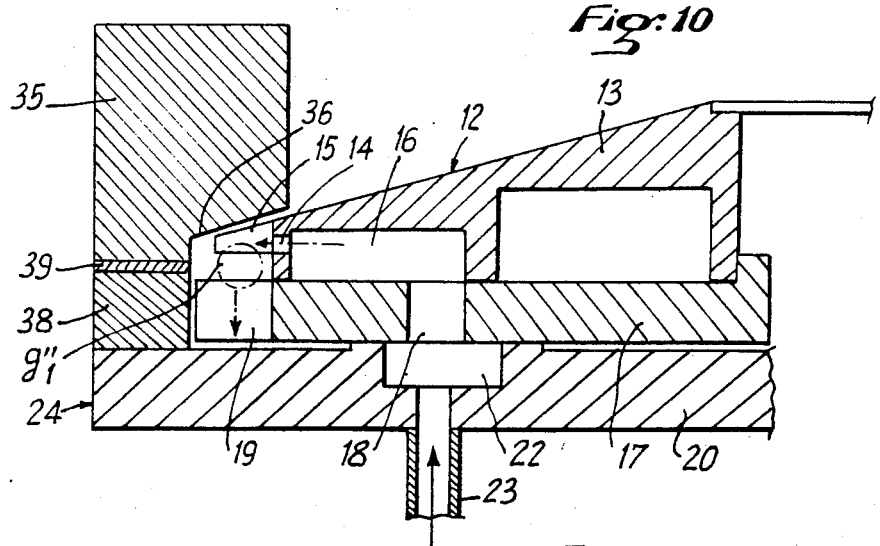
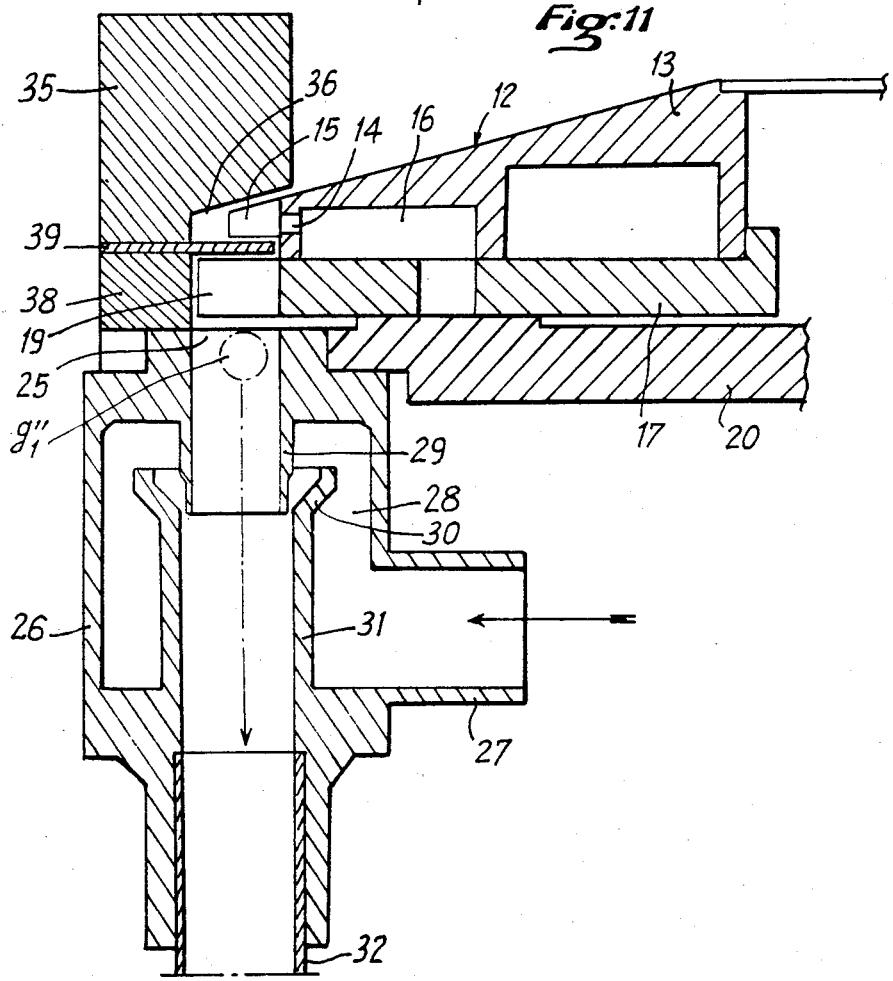

SELECTOR DEVICE FOR THE DISTRIBUTOR OF A SO-CALLED "SINGLE SEED" SEED DRILL

This application is a continuation of application Ser. No. 482,289, filed Apr. 5, 1983, now abandoned.

FIELD OF THE INVENTION

The present invention relates to distributors of so-called "single-seed" seed drills, that is to say devices which, in said seed drills, are arranged between a loose seed feed hopper and a transportation device conveying the seeds to the furrow formed in the soil for receiving them, the function of said devices being to take up seeds one by one from the hopper in order to bring them individually and according to a constant spacing in time to the transportation device.

BACKGROUND OF THE INVENTION

Various types of distributors which can be roughly classified into mechanical type distributors and suction type distributors are known. With the mechanical distributors, the surface of the which distributor is displaced continuously between the feed hopper and the transportation device is formed with recesses the volume of which corresponds substantially to that of the seed, the selector having as a function to expel or remove the seeds entrained by the distributor without being engaged into the recesses. With the suction distributors, the surface of the distributor providing the transportation is formed with orifices arranged in a row and connected to a negative pressure source, the selector expelling or removing the seeds which are not subjected to the suction effect of an orifice.

The disadvantages of the mechanical type distributors are that a specific distributor model is needed for each type of seed and even for each variety of the same plant, for example in the case of corn. In fact, the dimensions of the recesses have to correspond very precisely to those of the seed. This is even truer in the case of high precision mechanical distributors such as disclosed in U.S. Pat. No. 4,403,713 as although they bring about almost perfectly the absence of missing or duplicate seeds, without crushing any seeds, the dimensions of the various elements are narrowly determined by the size of the seed.

The disadvantages of the suction type distributors lie mainly in the fact that each orifice is likely to confine by suction several seeds at the same time, and that it is extremely difficult to remove the seeds in excess without having missing seeds. But a same diameter of the orifices permits distributing seeds having volumes varying within fairly large limits. In U.S. Pat. No. 3,796,346, a solution has been proposed to this problem, consisting, in a suction type distributor formed of a circular plate of horizontal axis in which the suction orifices open onto a face of the plate according to a concentric row, in providing two concentric rows of orifices, the orifices of the two rows situated on the same radius being close to each other, and a deflector arm sweeping the plate face at least accross the trajectory of the row of orifices which is most off-centre in order to move the seeds sucked by the orifices of said row and to pass them in front of the orifices of the second row so that, theoretically, a single seed be retained by suction by each orifice of said second row. The device is complex and, in practice, exclusively applicable to distibutors of horizontal axis, whereby a distributor can only provide the feeding of a single transportation device and therefore the setting in the soil of the seeds of a single row while the distributors of vertical axis the type considered in U.S. Pat. No. 4,403,713 can supply up to six and even to twelve transportation devices, and therefore a seed drill with six or twelve rows.

OBJECTS AND SUMMARY OF THE INVENTION

The object of the present invention is to provide a selector device for a distributor for a suction type seed drill, applicable to distributors of horizontal axis as well as to those of vertical axis and permitting associating the advantages of suction distributors, notably the fact that the distributor is not specifically related to a seed of given volume, to those of distributors of vertical axis such as the almost perfect elimination of missing and duplicate seeds, and the possibility of feeding several transportation devices from a single distributor.

According to the invention, this object is achieved with a selector combining a groove formed on the surface of the distributor and extending over the suction orifice, the axis of said groove being perpendicular to the path of travel of the suction orifice, with a deflector the limit of the action range of which is clear of the path of travel of the axis of the suction orifices by about the radius of one seed.

When several seeds are sucked by one and the same orifice in the case of a suction distributor, they are generally three in number, the seeds being arranged into a triangular configuration about the axis of the orifice. In any case, it is the problem of the elimination of these two extra seeds which is the most difficult to solve. According to the invention and due to the groove surrounding the suction orifice, the seeds move into a line when engaging said groove and the number of seeds retained by suction is at most two. If two seeds are retained in a groove, they are in engagement at a point which is substantially facing the orifice and they 'jut out' from the axis of said orifice, according to the groove axis, on a distance substantially equal to the diameter. The deflector will then push back the two seeds into the groove in order to bring the seed which is engagement with it on top of the orifice or in the vicinity of said orifice by increasing the suction effect exerted on said seed, the other seed being kept away from the suction effect of the orifice. When a single seed has been sucked by an orifice, it does not come in engagement with the deflector, or if it is displaced for the reason that it has a larger diameter, it is nevertheless retained by the suction effect.

The suction orifices and the grooves can be provided on the side face or faces or on the peripheral surface of a distributor plate of vertical or horizontal axis.

The section shape of the grooves can be of any type, but their radius of curvature at the bottom is preferably of the same order as that of the radius of the seeds to be treated. The deflector can sweep the distributor surface in which are formed the orifices and the grooves, and in such a case, the groove depth is preferably at most equal to the radius of a seed so that the deflector engages the seed according to a large circle. The deflector can also act at the end of the groove, particularly by sweeping the surface of the deflector which is perpendicular to that in which are formed the orifices and grooves, and in such a case, the depth of the groove is indifferent but preferably substantially equal to the diameter of the seed, but its length in the direction of the deflector and starting from the orifice axis is then limited to about one radius and one radius and a half of the seed to be treated. The value of one and a half radius is such that the seed to be displaced by the deflector is located, as to its hemisphere which is opposite to that where the contact is made, above the suction orifice while the other seed is subjected to a reduced suction effect.

According to a preferred embodiment, the distributor selector according to the invention is used in a distributor of the type disclosed in U.S. Pat. No. 4,403,713, and it includes a rotary distributor plate of substantially vertical axis with, on its periphery, at least one and preferably several transportation devices distributed angularly, the seeds being brought to the center of the distributor plate and passing through a first barrier means for limiting the number of seeds having access onto a peripheral crown of the plate in which are formed recesses for the seeds and a second barrier means for eliminating from the peripheral crown the seeds having passed the first barrier means, with the exception of a single seed per recess, and is characterized in that the recesses are formed of vertical grooves provided in the peripheral edge of the plate, with a suction orifice opening at the bottom of each groove, the suction orifice being connected to a vacuum source at least on the sector of the path of travel of the orifices comprised between the first barrier means and a point downstream of the second barrier means, but upstream of the transportation station, the fixed peripheral wall or walls, which close the grooves in order to retain therein the seeds upstream of the first barrier means, being interrupted on the portion corresponding to the suction sector at least upstream and facing the second barrier means, the lower edge of said second barrier means being situated above the distributor plate at a distance from the plane of the suction orifices which is substantially equal to or slightly more than the diameter of the seeds, so that the seeds which are not subjected to the suction effect fall onto the distributor plate before reaching the transportation station.

BRIEF DESCRIPTION OF THE DRAWINGS

The invention and its features will be better understood from the reading of the description of a preferred embodiment, made with reference to the accompanying drawings wherein:

FIG. 1 is a perspective schematic view given for explaining the operating principle of the selector device, FIG. 2 is a plan view and a partial sectional view along line II—II of FIG. 5 of the sector corresponding to a distribution station of an eight station distributor, FIG. 3 is an elevation view at a larger scale of a portion of the distributor toothed plates and pallets, FIG. 4 is a plan view of the pallet forming the lower selector, FIGS. 5 through 11 are schematic sectional views at a larger scale, respectively in the radial planes A—A, B—B, C—C, D—D, E—E, F—F and G—G of FIG. 5.

DETAILED DESCRIPTION OF THE INVENTION

Figure 7:
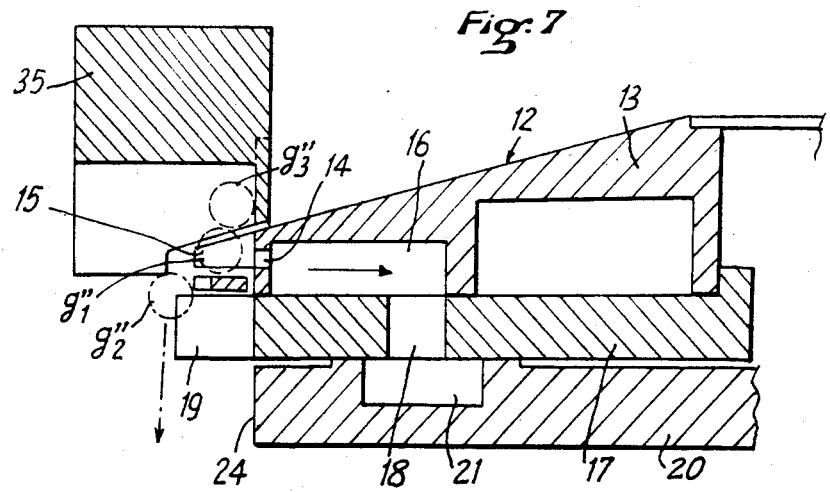

Schematically and as shown in FIG. 1, the distributor includes a hopper 1 for the seeds g. A wall of said hopper is formed by the surface 2 of a conveyor 3 which, generally, is a circular plate, but which for the sake of clarity is shown as a band moving in the direction of arrow F. As is usual in the case of a so-called pneumatic suction distributor, orifices 4 are formed across the conveyor and they move while closing a vacuum box 5 so that a suction effect is provided through said orifices for sucking and retaining the seeds g applied against the surface 2 around the opening or orifices 4.

According to the invention, grooves 6 are formed in the surface 2 of conveyor 3, transversely to the arrow F and in register with the orifices 4. Due to the existence of said grooves and the suction, the seeds g which are engaged in the groove are subjected to the most intense suction effect and it is possible to remove by gravity, a slight sweeping action or a blowing effect through a nozzle 7 the seeds g' which have been entrained on surface 2 without being in the grooves. Amongst the seeds which are in a groove 6, only the seed which is vertically above orifice 4, or the two seeds coupled on either side of an orifice, are subjected to a sufficient suction action to be retained. In each groove is therefore a single seed g, or two seeds g", and the problem is therefore to remove one of seeds g". According to the invention, there is combined with the distributor a deflector 8 the hatched action range 9 of which ends a distance d from the axial plane of the orifices 4 which is substantially equal to a radius of a seed g. When there is a duplicate, the deflector 8 will push back seed $g''_1$ which is closest in the direction of the axis of orifice 4 and said seed will be subjected to a more intense suction effect while that exerted on seed $g''_2$ will be simultaneously reduced. Seed $g''_1$ will finaly come in register with orifice 4 and seed $g''_2$ which is not retained will fall as seeds g'. Downstream of deflector 8 and at the level of the inlet orifice 10 of the transportation circuit of the distributed seeds, the suction through orifices 4 is cancelled and the seed is deflected toward said orifice by a deflector 11.

The embodiment of the invention which is described in detail with reference with FIGS. 2 through 11 is applicable to a distributor of the type disclosed in French Pat. No. 80 07 190, the seeds which are taken off from a hopper being brought up to the center of the convex and conical rotaty plate of the distributor, so as to be brought one by one to one of the transportation circuits, which are eight in number here, distributed on the periphery of the plate, the seeds forming duplicates being ejected at the distributor periphery and falling back into the hopper.

In the drawings, reference numeral 12 designates the conical surface of plate 13 of the distributor. The suction orifices 14 are distributed on the periphery of plate 13 and the grooves according to the invention are vertical and formed by teeth 15 the front face of which is radial while the rear face is slanting in order to provide an easy access for the seeds to the suction orifice 14. Each suction orifice 14 communicates with a cavity 16 formed in the lower face of plate 13.

Below plate 13 and driven in rotation therewith is mounted a plate 17 formed with an orifice 18 in register with cavity 16 and, at the periphery, with wings 19 having a spacing identical to that of teeth 15. As can be seen in FIG. 3, the wings 19 are inclined rearwardly and downwardly so as to bias downwardly a seed placed in the space between two wings:

Said two rotary plates are driven in rotation above a fixed plate 20. Facing the trajectory of the orifices 18 and in plate 20 is provided a suction or vacuum chamber 21 connected by a nipple 22 to a vacuum pump. In each station, the suction chamber extends over an upstream sector encompassing all the stages shown from A to E (FIG. 2) comprising the taking over of the seeds by the distributor and the elimination of the duplicates as will be described in more detail hereafter. Upstream and on the same circle is provided (FIG. 10) a blowing chamber 22' connected to a channel 23. The periphery 24 of said plate is beyond the end of teeth 15 and wings 19, with the exception of a sector S (FIG. 2) for selecting a single seed, where its radius is reduced (FIGS. 6 through 9) in order that its peripheral wall 24' be vertically underneath the root of the teeth and wings. On the other hand, plate 20 carries the distribution station having an inlet orifice 25. The injector 26 (FIG. 11) includes an inlet 27 of air under pressure, a distribution chamber 28, a central injector 29 opening into the collar of a head 30 extending into a central tube 31 and a flexible hose 32 extending to the drill coulter. Said injector is of known type.

The periphery of the distributor plate includes a fixed wall 33 in the shape of an inverted "L" (FIG. 5) permitting the access of the seeds onto the peripheral area where teeth are formed. Said wall has a portion 34 in the centripetal direction, at the beginning of sector S, with deflectors (FIG. 6) for limiting the number of seeds g entrained by the distributor. Downstream of sector S, the peripheral wall 35 extends inwardly up to the circle corresponding to the root of teeth 15 and it includes, in its inner lower ridge, a channel 36 provided for the free passage of the teeth. An orifice 37 between the end of the suction area 21 and the blowing point 22 is provided for compensating the pressures.

Between plate 20 and the peripheral sectors 33-35 is provided a sector which is a thickness wedge 38 on which is disposed a deflector forming blade 39 the configuration of which is shown in FIG. 4. Point 40 of blade 39 corresponds to the beginning of sector S and blade 39 has from then on and downstream a very reduced width at 41, and it ends in a surface with a peripheral edge forming a cam 42, the projection of which with respect to the inner circular edge 43 is substantially equal to the depth of the teeth. Beyond radius G-G corresponding to the transportation station, blade 39 is formed, in its most central portion, with a cut-out 44 the width of which corresponds substantially to the length of wings 19. Blade 39 engages between the lower plane of teeth 15 and the upper plane of wings 19.

The operation of the distributor will be explained herebelow.

Figure 8:
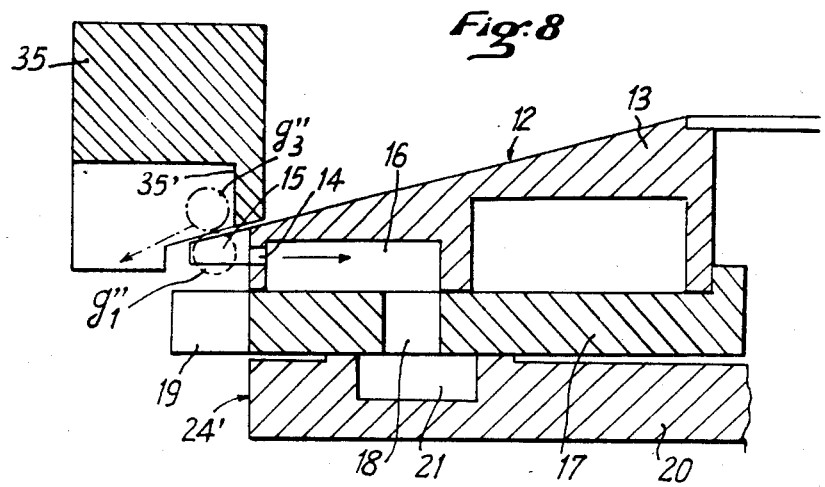
Figure 9:
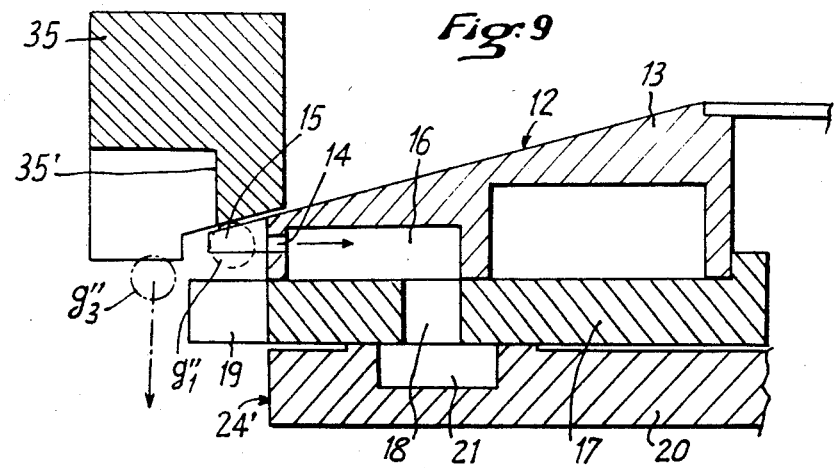

In the section following the transportation station and as shown in FIG. 5, blade 39 is protruding between wings 19 and teeth 15. The seeds g which are on the surface 12 of plate 19 enter into the chamber defined by the peripheral sector 33 and between teeth 15. In the following sector between FIGS. 5 and 6, the peripheral wall 34 comes closer to the end of the teeth in order to push back the seeds above plate 13, and blade 39 becomes narrower in the area 41 (FIG. 4) while the peripheral wall 34 disappears at the same time. The seeds g (FIG. 5) which are engaged, according to an engagement depth corresponding to their size, between teeth 15 are sucked by orifice 14 but those which are most remote fall back into the hopper (FIG. 7) while being moreover repelled, as regards those ($g''_2$) which could be half engaged between the teeth and subjected to some suction, by the deflector portion 42 of blade 39 (FIG. 4). From that moment, the seeds maintained by the distributor are only the seeds ($g''_1$) which have passed, by being engaged between teeth 15, above blade 39, and the seed, and less often the seeds ($g''_3$) which can be superimposed over said seed ($g''_1$) as shown in FIG. 7. Said seed $g''_3$ is then pushed back by the concave upstream portion 35' outwardly from the peripheral wall 35 (FIGS. 8 and 9). The selected seed $g''_1$ which is alone in an interval of teeth 15 reaches then the area (FIG. 10) corresponding to the cut-out 44 of blade 39. The suction exerted in orifice 14 by chamber 16 is cancelled, the orifice 18 not being any more above the suction chamber 21. The vacuum is cancelled by orifice 37 and, on the contrary, as orifice 18 comes into communication with the blowing chamber 22 which is in turn communicating via a tube 23 with a source of air under pressure, the seed $g''_1$ is blown in order to be disengaged from between teeth 15 and it falls into the chamber formed between two wings 19. When said chamber reaches a position in register with orifice 25 of the transportation device (FIG. 11), the seed $g''_1$ is sucked into tube 29 and expelled by the transportation air flux in tube 32.

The hereabove described embodiment is only a preferred example in the case of a vertical axis distributor, but the invention is also applicable to distributors of horizontal axis, band distributors, etc.

I claim:

1. A selector device for a distributor of a so-called "single-seed" seed drill, comprising a transportation device (13) having a surface having therein a series of single suction orifices (14) in communication with a vacuum source (16) for maintaining by suction the seeds on said surface, arranged in said surface along a linear path of travel, vertical grooves (15) formed on said surface of said transportation member over each suction orifice (14) and extending on opposite sides of the suction orifice, the axis of said groove (15) being perpendicular to the path of travel of the suction orifice and the size and shape of said groove being such as to accommodate in said groove only a single line of seeds disposed along said axis, and at least one deflector (42-35) the limit of the action range of which is clear of the path of travel of the axis of the suction orifice (14) by about the radius of one seed, said deflector being sufficiently close of the path of said orifices (14) to deflect into said path any seed which is disposed in and protrudes from said groove and which is on the same side of said path as said deflector, the groove being open at its end remote from the deflector, said transportation device comprising a rotary distributor plate (13) of substantially vertical axis with, on its periphery, at least one transportation device (25-32), the seeds being brought to the center of the distributor plate and passing through a barrier means (33-34 FIGS. 5 and 6) for limiting the number of seeds having access onto a periphery crown of the plate in which are formed recesses for the seeds comprising said vertical grooves (15) between teeth provided in the peripherl edge of the plate, there being a said suction orifice (14) opening at the bottom of each groove, the suction orifice being connected to a said vacuum source (16) at least on the sector of the path of travel of the orifices comprised between the barrier means (33-34) and said deflector situated downstream of the barrier means and upstream of the transportation device (25-32), there being fixed lower and peripheral walls (34-39), which close the grooves in order to retain therein the seeds upstream of the first barrier means, said walls being interrupted on the portion corresponding to the suction sector upstream and facing the deflectors, the edge of each deflector being situated relative to the distributor plate at a distance from the plane of the suction orifices which is substantially equal to or slightly more than the average radius of the seeds.

2. A distributor according to claim 1, wherein, in an interruption area (S) of the peripheral walls (33–35) and downstream of the first barrier means (34) are provided a first deflector (42) situated below the grooves formed by the teeth (15) the upper edge of which is situated under the distributor plate at a distance from the plane of the suction orifice which is substantially equal to or slightly more than the average radius of the seeds for eliminating the seeds ($g''_2$) sucked against the lower face of the teeth and recentering on the suction orificie (14) the seed ($g''_1$) nested in the interval between the teeth, and a second deflector (35') situated above the upper face of teeth (15) the lower edge of which is situated relative to the distributor plate at a distance from the plane of the suction orifices which is substantially equal to or slightly more than the average radius of the seeds for eliminating the seeds ($g''_3$) kept by suction against the upper end of the grooves.

* * * * *